United States Patent Office 2,731,390
Patented Jan. 17, 1956

2,731,390

STABILIZED FOLIC ACID AND VITAMIN COMPOSITION

Robert P. Tansey, Newark, and George H. Schneller, Basking Ridge, N. J., assignors to American Cyanamid Company, New York, N. Y., a corporation of Maine No Drawing. Application February 12, 1953, Serial No. 336,641

6 Claims. (Cl. 167—81)

This invention relates to novel means for stabilizing folic acid in multi-vitamin compositions and methods for preparing the same. More particularly, it is concerned with liquid vitamin preparations containing folic acid and other water-soluble vitamins.

The use of multi-vitamin compositions in the treatment of various conditions attributed to avitamosis has become widespread. Therapeutic dosage forms have been devised to dispense the vitamins in a suitable manner, and folic acid is considered to be a very desirable component of many of these pharmaceutical products. Though folic acid is essentially a stable compound, it is an established fact that it is unstable in the presence of certain vitamins and under certain conditions. Thus, folic acid is readily cleaved when it is present in liquid pharmaceutical preparations containing riboflavin or thiamin, particularly the former. This cleavage is significantly increased when these compositions of matter are exposed to air and are in the presence of light. Accordingly, there is a widespread demand at present for a stable liquid pharmaceutical composition containing folic acid together with particularly the B-complex vitamins which can be stored for appreciable lengths of time without excessive loss of its folic acid activity. Vitamins, in general, are more stable in acid media and multi-vitamin liquid preparations are consequently adjusted to an acid pH level. The present invention is operative at such pH levels.

The principal object of the present invention is to provide stabilized vitamin solutions containing folic acid and such other B-complex vitamins as riboflavin and thiamin under acid conditions. It is a further object to provide suitable means for the preparation of stable folic acid compositions containing added B-complex vitamins. Another object is to provide liquid pharmaceutical formulations such as syrups, elixirs, emulsions, suspensions, or mixtures, which incorporate folic acid as a stabilized component. Other objects will be apparent in the detailed description hereinafter provided.

In accordance with the embodiment of our invention, we have found that liquid compositions having enhanced folic acid stability can be prepared by incorporating therein a suitable antioxidant. Thus, in vitamin compositions prepared by dissolving folic acid in a suitable liquid vehicle containing an added antioxidant, the folic acid is found to be comparatively stable and can be stored for considerable periods of time without excessive decomposition of the folic acid component. Furthermore, since air and light accelerate the decomposition of folic acid, it is preferable to operate under controlled conditions of subdued light and an inert gas atmosphere.

Applicants have found through diligent testing of numerous antioxidants that certain ones will produce stabilized physiologically active solutions of folic acid and riboflavin for a considerable period of time. These antioxidants are nordihydroguaiaretic acid, butylated hydroxy anisole which, for instance, can be 2-tertiarybutyl-4-hydroxy anisole, 3-tertiarybutyl-4-hydroxy anisole or mixtures thereof and ethyl hydrocaffeate. These antioxidants are effective in relatively small amounts for stabilizing folic acid solutions and of themselves have no adverse effect on the final products.

The compositions of the present invention are preferably prepared by using 0.01% to 0.5% of antioxidants. A suitable concentration of the desired antioxidant or mixture of antioxidants for a particular formulation should be used. In general, concentrations of 0.05% to 0.02% have been found effective, although smaller amounts may be used under certain conditions. Larger amounts, aside from being less economical, under some conditions tend to precipitate. Other vitamins such as thiamin and riboflavin are added in quantities sufficient to give the desired dosage. Folic acid is added usually in a slightly alkaline solution. The various ingredients are incorporated with a buffered vehicle to give the desired total amount of mixture. The buffered vehicle which has been found useful can be made up of water, citric acid, disodium acid phosphate or other buffering agents to produce a pH of 3.5 to 5.5. It is also desirable to have present preservatives such as one or more of the esters of parahydroxybenzoic acid to assure mold-free preparations on standing. Agents such as ethyl alcohol, propylene glycol, polyethylene glycols, or surface-active agents may be used for their solubilizing effect on one or more of the ingredients and to aid in the over-all compounding of a pharmaceutical product. Suspending agents, such as water-dispersible cellulose derivatives, pectin and sodium alginate also may be used to adjust the viscosity and to achieve or maintain homogeneity of the final product. Such agents as certified food dyes and flavors may be incorporated in oral dosage forms.

In preparing the stable therapeutic solutions of the present invention hereinafter described in the examples the following general procedure is preferred. The buffer compounds are dissolved in sufficient water. The preservatives are dissolved in a small quantity of a suitable solvent, such as ethyl alcohol or propylene glycol, and added to the buffer solution. A slurry is made of the riboflavin in the same solvent and this in turn is added to the buffer solution with stirring and at a temperature sufficient to effect solution of riboflavin. The antioxidant is dissolved in a small quantity of a suitable solvent and this concentrate is incorporated in the buffer solution. The folic acid is dissolved in an alkaline buffer solution and this in turn is added to the buffer solution containing the other ingredients. Sufficient distilled water is added to bring the solution to proper volume. The compounding operations are preferably carried out in subdued light to insure the high potency of the finished product. Other vitamins, such as those of the vitamin B-complex series, can be incorporated by methods well known in the pharmaceutical arts.

It is to be understood that various changes can be made in the general procedure as hereinafter described without affecting the results attained. Also, variations in the amount of antioxidant used as illustrated hereinafter in the preferred embodiments of our invention can be made without departing from the scope thereof.

The following examples illustrate specific embodiments of our invention:

Example 1

A solution containing the following ingredients was prepared as described below:

Ingredients: Per 100 ml.
- Folic acid _____ gm__ 0.010
- Riboflavin _____ gm__ 0.010
- Nordihydroguaiaretic acid _____ gm__ 0.020
- Methyl parahydroxybenzoate _____ gm__ 0.030
- Propyl parahydroxybenzoate _____ gm__ 0.010
- Propylene glycol _____ ml__ 50.00
- Citric acid _____ gm__ 1.50
- Disodium acid phosphate _____ gm__ 1.00
- Distilled water, q. s. ad.

The citric acid and disodium acid phosphate were dissolved in recently boiled and cooled distilled water. Concentrates were prepared as follows: (1) the methyl and propyl parahydroxybenzoates were dissolved in a portion of the propylene glycol with warming, (2) a slurry was prepared containing the riboflavin in some of the propylene glycol, and (3) nordihydroguaiaretic acid was dissolved with warming in another portion of the propylene glycol. The concentrates were then respectively incorporated in the buffer solution. The remainder of the propylene glycol was added. The folic acid was dissolved in approximately 5 ml. of 0.1 N sodium hydroxide solution. This in turn was added with stirring to the buffer solution. Lastly, sufficient recently boiled and cooled distilled water was added to bring the solution up to volume. All processing was done in subdued light. The stability of the composition for varying periods of time up to two months was as follows:

| Storage Time | Conditions | Assay of Folic Acid Percent Decomposition |
|---|---|---|
| 2 weeks | R. T.[1] | 7 |
| 2 weeks | 45° C | 9 |
| 1 month | R. T.[1] | 9 |
| 1 month | 45° C | 11 |
| 2 months | R. T.[1] | 9 |

[1] Room temperature. Samples were stored in amber bottles.

A control sample, containing no nordihydroguaiaretic acid but similar in all other respects, showed 81.5% decomposition of folic acid after storage for one month at room temperature.

Example 2

A formulation containing folic acid was prepared as described below:

Ingredients: Per 100 ml.
- Folic acid _____ gm__ 0.015
- Riboflavin _____ gm__ 0.015
- Niacinamide _____ gm__ 0.200
- Thiamin hydrochloride _____ gm__ 0.020
- Pyridoxine hydrochloride _____ gm__ 0.010
- Carboxy methyl cellulose, sodium (CMC) _____ gm__ 0.150
- Syrup _____ ml__ 20.0
- Propylene glycol _____ ml__ 25.0
- Nordihydroguaiaretic acid _____ gm__ 0.020
- Butylated hydroxy anisole _____ gm__ 0.050
- Ethyl hydrocaffeate _____ gm__ 0.050
- Methyl parahydroxybenzoate _____ gm__ 0.050
- Propyl parahydroxybenzoate _____ gm__ 0.020
- Sodium phosphate-citric acid buffer, q. s.

The citric acid and sodium phosphate were dissolved in recently boiled and cooled distilled water. The B-complex vitamins were dissolved in this buffer solution. The following concentrates were prepared: (1) the methyl and propyl parahydroxybenzoates were dissolved in a portion of the propylene glycol with warming, (2) the antioxidants were dissolved with warming in another portion of the propylene glycol, and (3) the folic acid was dissolved in a citric acid-sodium phosphate buffer at pH 7.5. A slurry of the (CMC) and remaining propylene glycol was made. The concentrates were then respectively incorporated in the buffer solution containing the other vitamins. The (CMC) portion was incorporated in the buffer solution and lastly the syrup was added. Sufficient distilled water was used to obtain the correct volume. All processing was done in subdued light.

Stability data at various time intervals and under various conditions are as follows:

| Storage Time | Conditions | Folic Acid: Percent Decomposition | |
|---|---|---|---|
| | | No Stabilizers Present | Stabilizers Present |
| 4 days | R. T.[1] | 8 | 5 |
| 10 days | R. T.[2] (daylight) | 95 | 6 |
| 21 days | 45° C | 36 | 14 |
| 5 weeks | R. T.[1] | 14 | 5 |

[1] Room temperature. Samples stored in amber bottles in dark area.
[2] Samples stored in flint glass bottles in daylight.

Samples prepared according to Example 2, but containing only one antioxidant per formulation, respectively, showed similar satisfactory results for like storage intervals.

Example 3

A solution containing the following ingredients was prepared as described below:

Ingredients: Per 100 ml.
- Folic acid _____ gm__ 0.015
- Riboflavin _____ gm__ 0.010
- Butylated hydroxy anisole _____ gm__ 0.050
- Methyl parahydroxybenzoate _____ gm__ 0.030
- Propyl parahydroxybenzoate _____ gm__ 0.010
- Propylene glycol _____ ml__ 5.0
- Lactic acid _____ ml__ 3.0
- Dibasic sodium phosphate _____ gm__ 1.0
- Citric acid _____ gm__ 0.1
- Distilled water, q. s. ad.

The procedure for preparing this solution is similar to that described in Example 1. Stability data indicate only a 6% loss of folic acid in samples stored in amber bottles for one month at room temperature. A similar preparation without butylated hydroxy-anisole shows much greater deterioration for the same time interval.

Example 4

A formulation similar to that described under Example 3, but containing nordihydroguaiaretic acid instead of butylated hydroxy anisole, showed only a 3% loss of folic acid in samples stored for one month at room temperature.

Example 5

A solution containing the following ingredients was prepared as described below:

Ingredients: Per 100 ml.
- Folic acid _____ gm__ 0.010
- Riboflavin _____ gm__ 0.010
- Ethyl hydrocaffeate _____ gm__ 0.050
- Methyl parahydroxybenzoate _____ gm__ 0.030
- Propyl parahydroxybenzoate _____ gm__ 0.010
- Propylene glycol _____ ml__ 15.0
- Sucrose _____ gm__ 20.0
- Citric acid _____ gm__ 1.5
- Disodium acid phosphate _____ gm__ 0.84
- Distilled water, q. s. ad.

The procedure for preparation of this formulation is similar to that described under Example 1. Stability data indicate only a 5% loss of folic acid in samples stored in amber bottles for 3 months at room temperature. The same composition without ethyl hydrocaffeate showed a 45% loss of folic acid for the same period.

*Example 6*

Formulations similar to the foregoing but with soluble forms of riboflavin in place of the Riboflavin U. S. P. and containing also folic acid with added nordihydroguaiaretic acid or ethyl hydrocaffeate, also show excellent stability for the folic acid component. More specifically, the soluble forms of riboflavin used were riboflavin-5'-phosphate sodium and riboflavin-5'-phosphate diethanolamine, respectively. Stability data show only a 5% to 6% loss on samples stored in amber bottles at room temperature for three months.

*Example 7*

A preparation containing the following ingredients was prepared as follows:

Ingredients: Per 100 ml.
- Folic acid _____ gm__ 0.015
- Thiamin hydrochloride _____ gm__ 0.020
- Ethyl alcohol _____ ml__ 5.0
- Ethyl hydrocaffeate _____ gm__ 0.05
- Methyl and propyl parahydroxybenzoates, q. s.
- Sodium phosphate-citric acid buffer, q. s.

In preparing this formulation the thiamin hydrochloride and an alcoholic solution containing the parahydroxybenzoates and the ethyl hydrocaffeate were incorporated in the buffer solution. A concentrate of folic acid in a sodium phosphate-citric acid buffer (pH 7.5) was prepared and subsequently added. Sufficient buffer was added to obtain the proper volume.

Samples stored for 21 days at 45° C. in amber bottles showed only a 3.7% loss of folic acid.

*Example 8*

A solution containing the following ingredients was prepared as described below:

Ingredients: Per 100 ml.
- Folic acid _____ gm__ 0.010
- Riboflavin _____ gm__ 0.010
- Nicotinamide _____ gm__ 15.0
- Ethyl alcohol _____ ml__ 2.0
- Butylated hydroxy anisole (BHA) _____ gm__ 0.02
- Methyl and propyl parahydroxybenzoates, q. s.
- Sodium phosphate-citric acid buffer, q. s.

The procedure for preparing this solution is similar to that described under Example 7.

Stability data indicate a 15% loss of folic acid in samples stored in amber bottles for 21 days at 45° C. A control sample, containing no BHA showed a 55% loss for the same time interval and under the same conditions.

The examples above describe the preparation of stable, therapeutically effective vitamin solutions of folic acid and riboflavin. Other vitamins can be added to these mixtures, particularly those of the vitamin B-complex since, in general, they also are stable at a pH within the range 3.5 to 5.5. The examples above disclose the remarkably low decomposition of folic acid in periods ranging up to two months, whereas in the past it is well known, and substantiated by control preparations without antioxidants prepared by us, that folic acid in aqueous systems containing riboflavin tends to decompose rapidly.

We claim:

1. A stable therapeutic vitamin preparation comprising folic acid, B-complex vitamins, water and antioxidants from the group consisting of nordihydroguaiaretic acid, a butylated hydroxy anisole and ethyl hydrocaffeate, having a pH between 3.5 and 5.5.

2. A stable vitamin solution comprising water, 0.01% to 0.5% folic acid, 0.01% to 0.5% riboflavin and 0.02% to 0.05% antioxidant from the group consisting of nordihydroguaiaretic acid, butylated hydroxy anisole and ethyl hydrocaffeate, said solution having a pH within the range of 3.5 to 5.5.

3. A stable therapeutic preparation comprising 10% to 60% propylene glycol-aqueous solution having a pH of between 3.5 and 5.5, containing folic acid, riboflavin and 0.02% to 0.05% antioxidant from the group consisting of nordihydroguaiaretic acid, butylated hydroxy anisole and ethyl hydrocaffeate.

4. A folic acid-containing stable vitamin solution comprising riboflavin, water, nordihydroguaiaretic acid and not less than 0.01% folic acid, said solution having a pH within the range of 3.5 to 5.5.

5. A folic acid-containing stable vitamin solution comprising riboflavin, water, a butylated hydroxy anisole and not less than 0.01% folic acid, said solution having a pH within the range of 3.5 to 5.5.

6. A folic acid-containing stable vitamin solution comprising riboflavin, water, ethyl hydrocaffeate and not less than 0.01% folic acid, said solution having a pH within the range of 3.5 to 5.5.

References Cited in the file of this patent

UNITED STATES PATENTS

| Number | Name | Date |
| --- | --- | --- |
| 2,373,192 | Lauer | Apr. 10, 1945 |
| 2,449,041 | Upham | Sept. 7, 1948 |
| 2,601,569 | Suter | June 24, 1952 |
| 2,695,860 | Weidenheimer | Nov. 30, 1954 |

OTHER REFERENCES

Am. Perf. & Essential Oil Rev., April 1950, p. 281.

Scheindler: Journal of the Am. Pharm. Assn., Sci. Ed., vol. 41 (1952), pp. 420 to 427.